(12) United States Patent
Dominique et al.

(10) Patent No.: US 7,568,228 B2
(45) Date of Patent: Jul. 28, 2009

(54) INTRUSION DETECTION IN DATA PROCESSING SYSTEMS

(75) Inventors: Alessandri Dominique, Zurich (CH);
James F. Riordan, Adliswil (CH);
Andreas Wespi, Mettmenhasli (CH)

(73) Assignee: International Business Machines Corporation, Armonk, NY (US)

( * ) Notice: Subject to any disclaimer, the term of this patent is extended or adjusted under 35 U.S.C. 154(b) by 1398 days.

(21) Appl. No.: 10/150,783

(22) Filed: May 17, 2002

(65) Prior Publication Data

US 2002/0194469 A1   Dec. 19, 2002

(30) Foreign Application Priority Data

Jun. 14, 2001 (EP) .................................. 01810577

(51) Int. Cl.
*G06F 11/00* (2006.01)
*G06F 11/14* (2006.01)
(52) U.S. Cl. .................... 726/23; 726/25; 709/224; 709/225; 714/763
(58) Field of Classification Search .............. 726/22–26; 713/150; 709/235, 224
See application file for complete search history.

(56) References Cited

U.S. PATENT DOCUMENTS

| | | | | |
|---|---|---|---|---|
| 5,892,903 A | * | 4/1999 | Klaus | 726/25 |
| 5,898,368 A | * | 4/1999 | Handley et al. | 340/514 |
| 5,961,644 A | * | 10/1999 | Kurtzberg et al. | 726/23 |
| 6,088,804 A | * | 7/2000 | Hill et al. | 726/25 |
| 6,453,345 B2 | * | 9/2002 | Trcka et al. | 709/224 |
| 6,574,737 B1 | * | 6/2003 | Kingsford et al. | 726/25 |
| 6,711,127 B1 | * | 3/2004 | Gorman et al. | 726/23 |
| 7,124,440 B2 | * | 10/2006 | Poletto et al. | 726/23 |
| 7,278,159 B2 | * | 10/2007 | Kaashoek et al. | 726/22 |
| 2002/0032871 A1 | * | 3/2002 | Malan et al. | 713/201 |
| 2002/0035628 A1 | * | 3/2002 | Gil et al. | 709/224 |
| 2002/0178383 A1 | * | 11/2002 | Hrabik et al. | 713/201 |

FOREIGN PATENT DOCUMENTS

| | | |
|---|---|---|
| WO | 00/38036 | 6/2000 |
| WO | WO-01/33359 A1 | 5/2001 |

OTHER PUBLICATIONS

Nicholas et al, A software platform for testing Intrusion Detection Systems, 1997 IEEE,43-50.*
A Methodology for Testing Intrusion Detection Systems; Nicholas et al;Sep. 27, 1996.*

* cited by examiner

*Primary Examiner*—Nasser G Moazzami
*Assistant Examiner*—Fikremariam Yalew
(74) *Attorney, Agent, or Firm*—Harrington & Smith, PC (57) ABSTRACT

Described is apparatus for testing an intrusion detection system in a data processing system. The apparatus comprises an attack generator for generating attack traffic on a communications path in the data processing system. A collector receives responses generated by the intrusion detection system on receipt of the attack traffic. A controller coupled to the attack generator and the collector varies the attack traffic generated by the attack generator in dependence on the response received from the intrusion detection system by the collector.

20 Claims, 7 Drawing Sheets

INTRUSION DETECTION IN DATA PROCESSING SYSTEMS

The present invention relates generally to intrusion detection in data processing systems and particularly to a method, apparatus, and a computer program element for testing intrusion detection in data processing systems.

There has been a growing number of incidents in which the security of computer networks has been breached. These incidents have lead to the introduction of a variety of intrusion detection systems for detecting paths for breaking in to computer networks. Such paths will hereinafter be referred to as attacks. Intrusion detection systems are typically implemented by computer software executable by programmable data processing hardware connected to the network under observation. In operation, a typical intrusion detection system generates an alarm upon detection of a break in path. The alarms usually include reports indicative of the type of attack. These reports are collected and interpreted. A problem associated with conventional intrusion detection systems is that they tend to generate a large number of false alarms. This complicates the task of interpretation to the extent that genuine attacks can go undetected. The rapid growth of distributed and heterogeneous computing networks, and the corresponding proliferation of intrusion detection systems connected with such networks, has exasperated the problem.

In accordance with the present invention, there is now provided apparatus for testing an intrusion detection system in a data processing system, the apparatus comprising: an attack generator for generating attack traffic on a communications path in the data processing system; a collector for receiving responses generated by the intrusion detection system on receipt of the attack traffic; and, a controller coupled to the attack generator and the collector for varying the attack traffic generated by the attack generator in dependence on the response received from the intrusion detection system by the collector.

Preferred embodiments of the present invention further comprise a traffic generator for generating background traffic on the communications path. The controller is preferably connected to the traffic generator for varying the background traffic generated by the traffic generator in dependence on the response received from the intrusion detection system.

In particularly preferred embodiments of the present invention, the attack generator comprises: an attack tool for generating the attack traffic; a plurality of logical layers disposed between the attack tool and the communication path for communicating the attack traffic from the attack tool to the communications path, each logical layer having a control interface for receiving attack variation data; and control logic connected to the controller for sending attack variation data to the logical layers via the control logic to vary the attack traffic based on control data, the attack variation data being generated by the control logic in dependence on the response received from the intrusion detection system by the collector.

The communications path may comprise a bus subsystem. Alternatively, the communication path may comprise a network.

Viewing the present invention from another aspect, there is now provided a method for testing an intrusion detection system in a data processing system, the method comprising: generating by an attack generator attack traffic in a communications path in the data processing system; receiving by a collector responses from the intrusion detection system to the attack traffic generated by the attack generator; and, varying by a controller coupled to the attack generator and the collector the attack traffic generated by the attack generator in dependence on the response received by the collector from the intrusion detection system. The present invention also extends to a computer program element comprising computer program code means which, when loaded in a processor of a data processing system having an intrusion detection system configures the processor to perform a method as hereinbefore described. The present invention further extends to a data processing system comprising a processor, a memory, a bus subsystem interconnecting the memory and processor, and a computer program element as hereinbefore described stored in the memory.

Preferred embodiments of the present invention will now be described, by way of example only, with reference to the accompanying drawings, in which.

Figure 1:
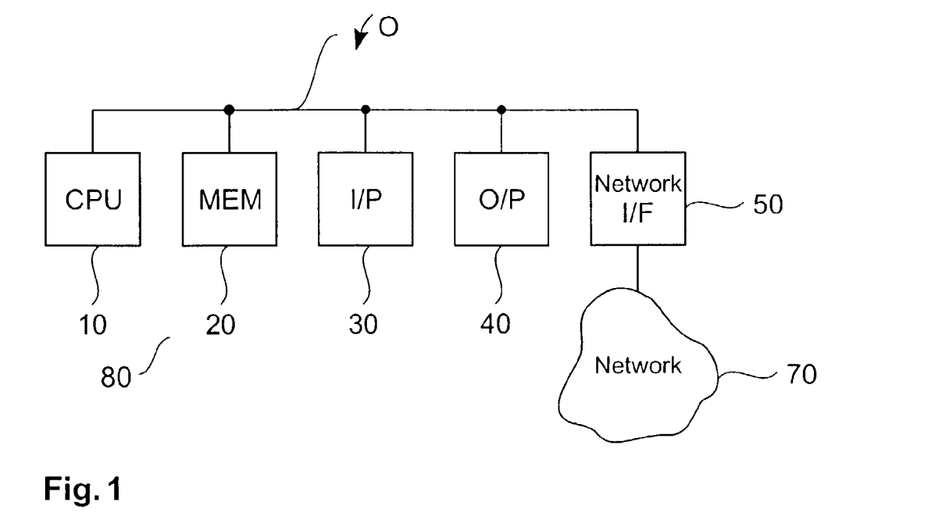
FIG. 1 is a block diagram of an example of a data processing system.

Referring first to FIG. 1, an example of a data processing system comprises a computer system 80 having: a central processing unit 10; a memory subsystem 20, a user input subsystem 30, a user output subsystem 40, and network interface 50 all interconnected by bus subsystem 60. The memory subsystem 20 includes a random access memory, a read only memory, and a mass storage device such as a hard disk drive. The user input subsystem 30 includes a keyboard, or a pointing device such as a mouse, or both. The user output subsystem 40 includes a display, a printer, or both. In operation, the central processing unit 10 executes computer program instruction codes stored in the memory subsystem 20. The computer program codes include operating system software and application program software for execution in conjunction with operating system software. The application program software operates on data stored in the memory subsystem 20. The user can control execution of the application software via the user input subsystem 30. Application software and data can be communicated between the memory subsystem 20 and an external data network 70 via the network interface 50.

Figure 2:
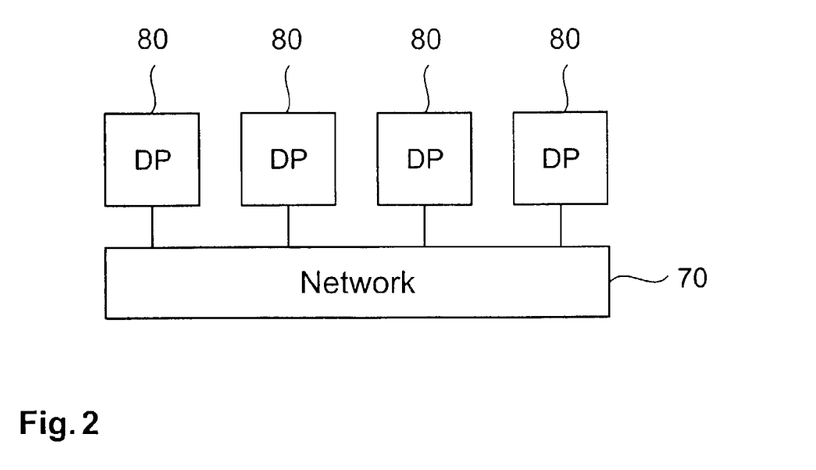
FIG. 2 is a block diagram of another example of a data processing system.

Referring now to FIG. 2, another example of a data processing system comprises a plurality of computer systems 80 as hereinbefore described with reference to FIG. 1 interconnected via the network 70.

Figure 3:
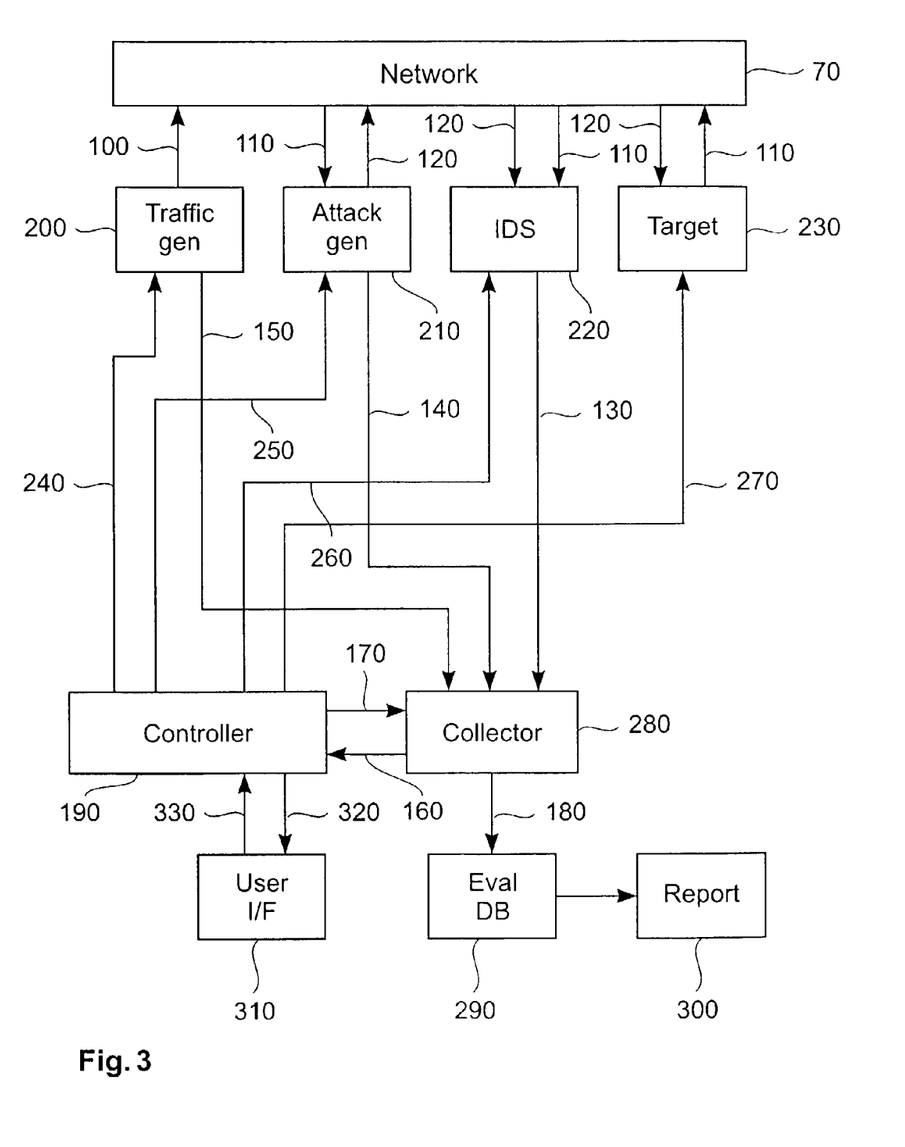
FIG. 3 is a block diagram of an example of intrusion detection apparatus according to the present invention.

With reference to FIG. 3, an example of apparatus for enhancing intrusion detection in a data processing system as hereinbefore described with reference to FIG. 2 comprises an attack generator 210 and an intrusion detection system (IDS) 220 connected to a communications path comprising the network 70. Also connected to the network 70 in this example is a traffic generator 200, and a target computer system 230. A controller 190 is connected to the attack generator 210 and the traffic generator 200, the IDS 220, and the target 230. The attack generator 210, the IDS 220, the controller 190, and the traffic generator 200 are all connected to a collector 280. The collector 280 is connected to an evaluation database 290 recorded in a storage device such as a hard disk drive. The evaluation database 290 is connected to a reporting device 300. A user interface 310 is connected to the controller 190. The target computer system 230 may be a computer system 80 as hereinbefore described with reference to FIG. 1. Similarly, the attack generator 210, IDS 220, traffic generator 200, controller 190, collector 280, evaluation database storage 290, user interface 310, and reporting device 300 may be integrated into a computer system 80 as hereinbefore described with reference to FIG. 1. In such an arrangement, the user interface 310 may comprises the user input subsystem 30 and the user output subsystem 40. It will also be appreciated that the reporting device 300 may be integrated into the user interface 310.

In operation, the traffic generator 200 generates background data traffic 100 on the network 70 under the control of the controller 190. The attack generator 210 generates attacks 120 on the network 70 and receives responses 110 to such attacks from the network 70. The IDS 220 receives the attacks 110 and responses 120 from the network 70. The target computer system 230 receives attacks 120 from the network 70 and sends responses 110 to the attacks 120 to the network 70.

The IDS 220 connected to the network 70 generates alarms 130 based on attacks 120 received. The alarms 130 are sent to the collector 280. Similarly, the attack generator 210 sends attack data 140 indicative of attacks executed, variations applied, and target responses to the collector 280. The target responses contain data indicative of whether a particular attack 120 was a success or a failure. The traffic generator 200 sends traffic data 150 indicative background traffic applied to the collector 280. The controller 190 sends reference data 170 indicative of intended attack variations and background activity to the collector 280. The collector 280 gathers together the information supplied to it by the IDS 220, the traffic generator 200, the controller 190, and the attack generator 210 into combined data 180.

The combined data 180 is stored in the evaluation database 290. However, the collector 280 also supplies feedback data 160 in the form of status information to the controller 190. The controller 190 generates traffic adjustment data 240 for adjusting the background traffic activity generated by the traffic generator 200. The traffic adjustment data 240 is sent from the controller 190 to the traffic generator 200. The controller 190 also generates attack adjustment data 250 for varying the attacks generated by the attack generator 210. The attack adjustment data 250 is sent from the controller 190 to the attack generator 210. The controller 190 also generates reset data 260 for flushing alarms from the IDS 220. The reset data 260 is sent from the controller 190 to the IDS 220. Furthermore, the controller 190 generates configuration data 270 for resetting the target 230. The configuration data 270 is sent form the controller 190 to the target 230. The traffic adjustment data 240 and the attack adjustment data 250 are generated by the controller 190 in dependence on the feedback data 160 received from the collector 280. The user interface 310 permits a user to manually control testing of the IDS 220 through issuance of instructions 320. Similarly, the user interface 310 permits the user to monitor status data 320 indicative of the progress made in testing the IDS 220.

Figure 4:
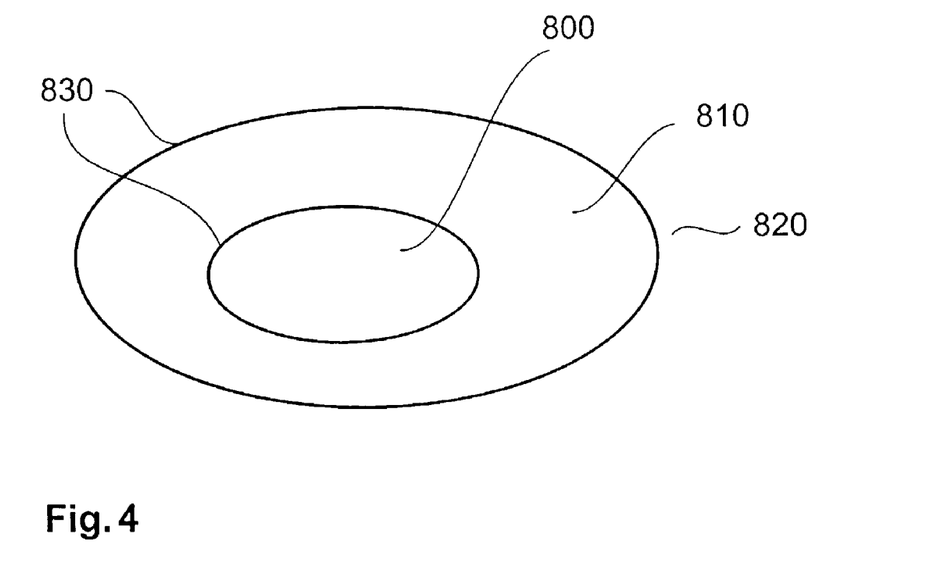
FIG. 4 is a chart showing thresholds between already known attacks, hitherto unknown successful attacks, and unsuccessful attacks.

Based on the attack adjustment data 250 received from the controller 190, the attack generator 210 varies the attacks 120 that it places on the network 70. Similarly, based on the traffic adjustment data 240 received from the controller 190, the traffic generator 200 varies the amount of background traffic 100 that it places on the network 70. The variations applied to the attacks generated by the attack generator 210 may include one or more of the following: splitting Internet Protocol (IP) packets into smaller IP fragments; use of smaller Transport Control Protocol (TCP) segment sizes; modifications to protocol flags in datagrams; and hexadecimal encoding of characters in Universal Resource Locators (URLs). Referring to FIG. 4, the feedback data 160 can be employed to detect thresholds 830 between already known attacks 800, hitherto unknown successful attacks 810, and unsuccessful attacks 820 based on the variations applied to the attacks and/or the background traffic. The identification of such thresholds 830 enables the characterization of the IDS 220 under different environmental conditions. The identification of the thresholds 830 also permits the optimization of the sensitivities of IDS 220 to incoming attacks.

In particularly preferred embodiments of the present invention, the attack generator 210, intrusion detection systems 220, traffic generator 200, controller 190, and collector 280 are implemented by digital logic. Such digital logic may include computer program code stored in memory and executable by programmable processor devices, hardwired logic circuitry, or a combination of computer program code and hardwired logic circuitry.

Figure 5:
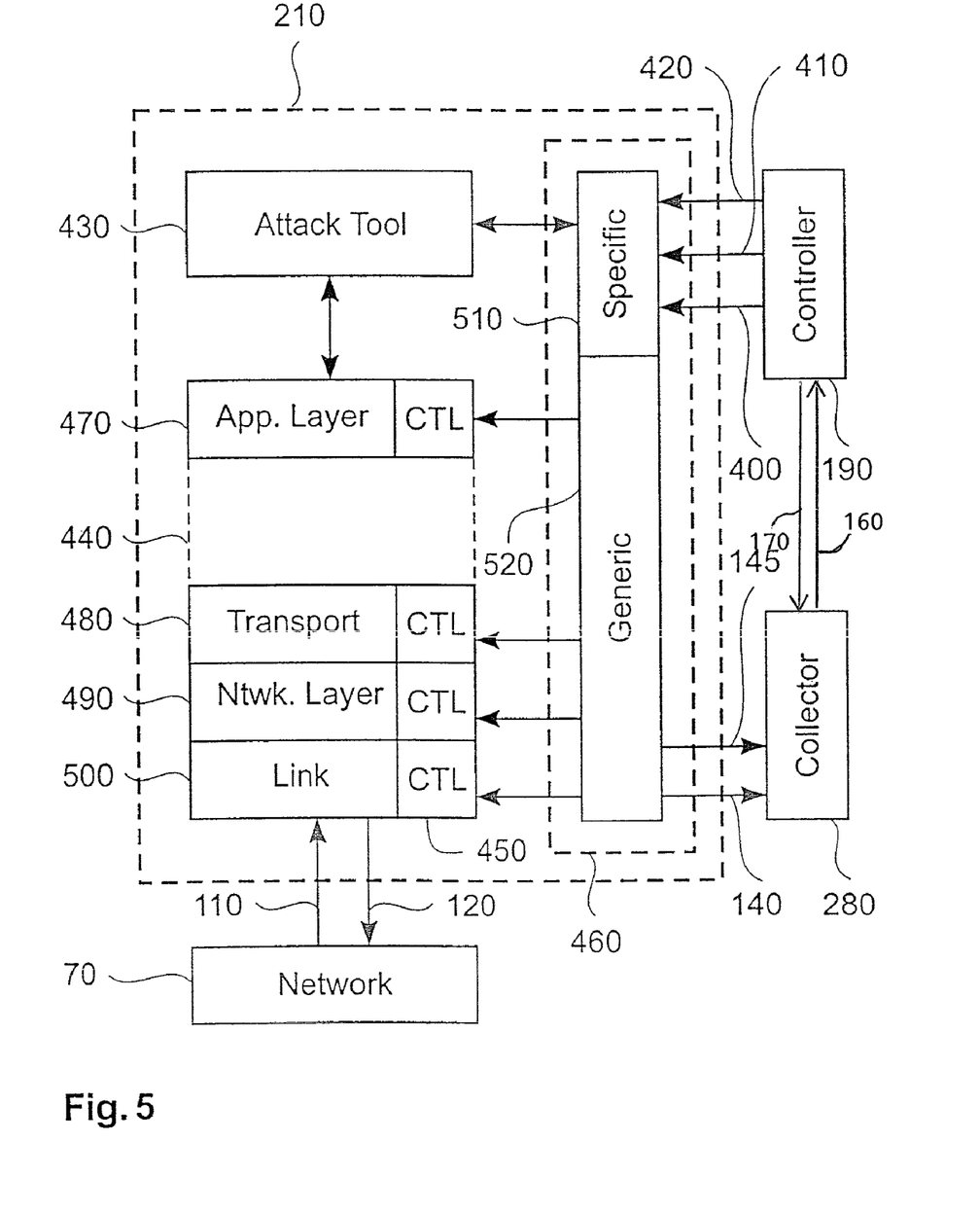
FIG. 5 is a block diagram of an attack generator for the apparatus shown in FIG. 3.

Referring now to FIG. 5, in a particularly preferred embodiment of the present invention, the attack generator 210 comprises attack execution control logic 460 connected to the controller 190 and the collector 280. The control logic 460 is also connected to a plurality of communications layer specific modules 440. More specifically, each of the modules 440 has a control interface 450 connected to the control logic 460. Each of the layer modules 440 corresponds to a different layer of the International Standards Organization (ISO) reference model. Specifically, the layer modules 440 comprise: an application layer module 470 for performing application layer functions such as the HyperText Transfer Protocol (HTTP), the Remote Terminal (TELNET) protocol, and the File Transfer Protocol (FTP); a presentation layer module (not shown) for performing presentation layer functions; a session layer module (not shown) for performing session layer functions; a transport layer module 480 for performing transport layer functions such as the Transport Layer Protocol (TCP) and the User Datagram Protocol (UDP); a network layer module 490 for performing network layer functions such as the Internet Protocol (IP); and, a link layer module 500 for performing link layer functions such as the Logical Link Control (LLC) protocol, a Medium Access Control (MAC). An attack tool 430 is connected to the application layer module 470. The attack tool 430 is also connected to the control logic 460. The link layer module 500 is connected to the network 70. The control logic 460 comprises an attack tool specific portion 510 and a generic portion 520. The attack tool specific portion is connected to the attack tool 430 and the controller 190. The generic portion 520 is connected to the control interfaces 450 of the stack 440 and the collector 280. The modules 440, control logic 460, and attack tool 430 may be physically implemented by hardware, logically implemented by software, or implemented by a combination of hardware and software.

In operation, the control logic 460 initiates the execution of an attack from the attack tool 430 and applies variations to the attack via the control interfaces 450 to the layer modules 440. The initiation and variation of an attack are based on configuration data 400, definition data 410, and attack specification data 420 supplied to the control logic 460 by the controller 190. The configuration data 400 comprises rules describing combinations of variations in attack that can be applied concurrently to the network 70 by the attack generator 210. The definition data 410 comprises an indication of an attack sequence and the variations to be applied therein. The attack specification data 420 comprises a definition of where variations are allowed and where variations are not allowed. The control logic 460 instructs to the attack tool 430 to initiate an attack 120 based on the configuration data 400, the definition data 410, and the attack specification data 420 supplied by the controller 190. The control logic 460 sends report data 140 to the collector 280. The report data 140 comprises information indicative of attacks launched and variations applied. The attack 120 is supplied from the attack tool 430 to the network 70 via the layer modules 440. A reaction 110 to the attack 120 is received by the attack tool 430 again via the layer modules 440. The reaction 10 is sent from the attack tool 430 to the control logic 460. The control logic 460 sends interpretation data 145 to the collector 280. The interpretation data 145 comprises a report of the reaction 110 received. The control interface 450 connected to each of the layer modules 440 permits the control logic 460 to vary the attack 120 at the corresponding layer of the protocol stack in accordance with the configuration data 400 and the definition data 410 received from the controller 190.

The embodiments of the present invention herein before described permit consistent testing of the sensitivity of an IDS under test to deviations from known forms of attack. The testing allows the creation of a more detailed view of the strengths and weaknesses of the IDS under test than was hitherto possible with conventional systems. The attack tool 430 generating the attack 120 is separated from both the variation of the attack 120 by the layer modules 440 as the attack 120 passes from one layer of the protocol stack to the next and the control logic 460 that controls the set of variation applied to the attack 120. This arrangement advantageously permits the variations in the attack to be controlled independently of the attack tool 430 employed. Thus, no modifications of the attack tool 430 need be made to facilitate the introduction of the variations. Another advantage associated with this arrangement is that variations at each layer can be applied concurrently in different sets according to predefined rules. The variations may be of a discrete nature. Examples of such discrete variations include the selective enabling and disabling of protocol flags. However, the variations may also be of a continuous nature. Examples of such continuous variations include the setting and resetting of parameters within a range of possible values. The feedback data 160 may be employed to dynamically adjust the variation employed in accordance with the response of the IDS 220 under evaluation to the attack 120. Specifically, the feedback data 160 may prompt the controller 190 to enable or disable a variation applied to the attack 120 or to adjust parameters associated with a currently enabled variation.

The preferred embodiment of the present invention hereinbefore described with reference to FIG. 1 included a single IDS 220. However, it will be appreciated that other embodiments of the present invention may include more than one IDS. Likewise, the preferred embodiment of the present invention hereinbefore described with reference to FIG. 1 included a single attack generator 210. However, it will again be appreciated that in other embodiments of the present invention may include more than one attack generators.

In the preferred embodiments of the present invention hereinbefore described, the modules 440 operate in accordance with corresponding layers of the OSI data communications layer model. However, it will be appreciated the present invention may be applied more generally to data processing systems in which data transfers between processing elements are effected via a sequence of logical layers.

Figure 6:
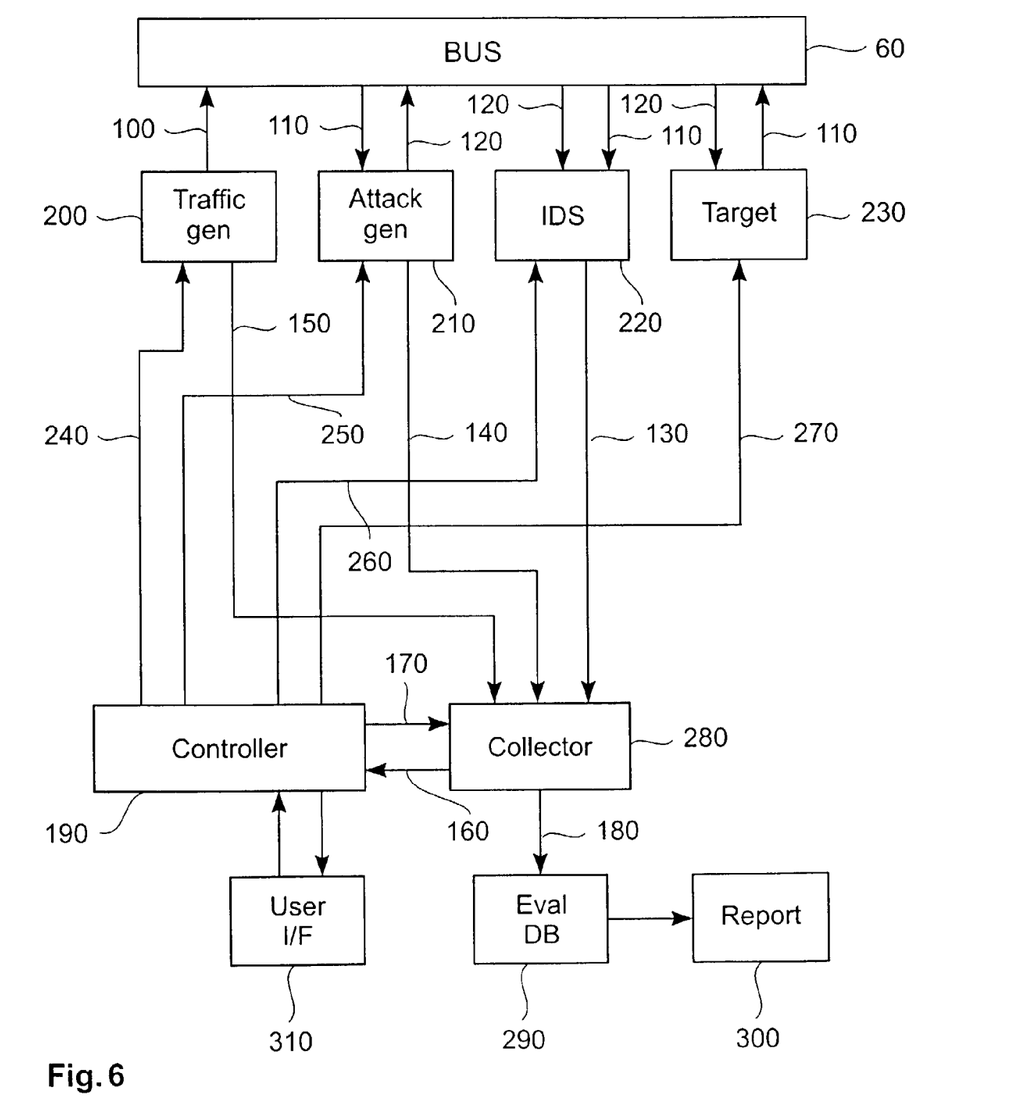
FIG. 6 is a block diagram of another example of intrusion detection apparatus according to the present invention.
Figure 7:
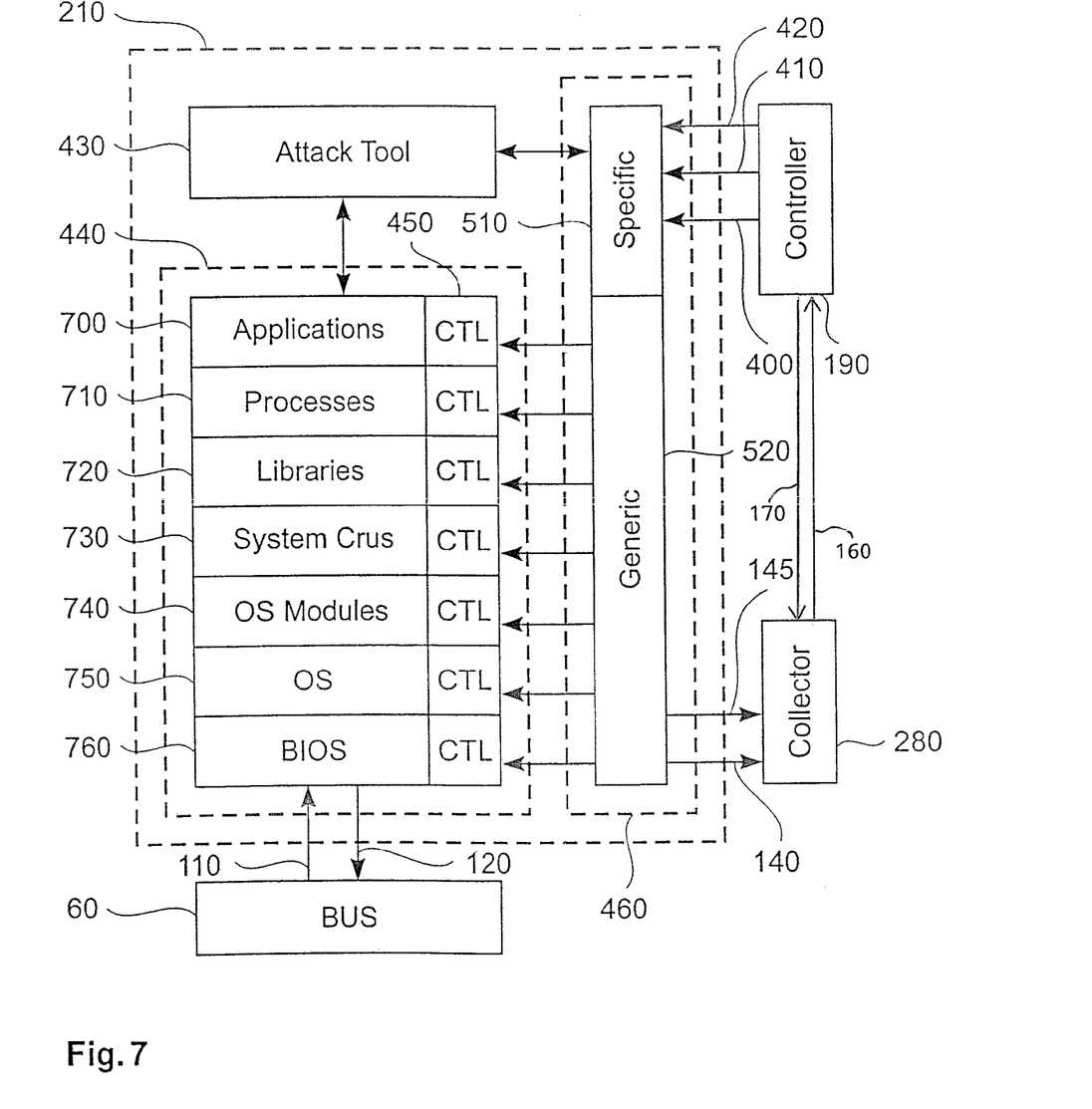
FIG. 7 is a block diagram of an attack generator for the apparatus shown in FIG. 6; and, FIG. 8 is a flow chart corresponding to a method of testing intrusion detection in accordance with the present invention.

Preferred embodiments of the present invention have been hereinbefore described with reference to a data processing system in which plural computer systems 80 are interconnected by a communications path in the form of a network 70. However, the present invention is equally applicable to intrusion detection within a data processing system comprising a single computer system 80. For example, referring to FIG. 6, in another preferred embodiment of the present invention, the traffic generator 200, attack generator 210, and IDS 220 are connected to the bus subsystem 60 of a host data processing system 80 together with the target processing object 230 under attack. With reference to FIG. 7, the stack 440 of the attack generator 210 in this embodiment comprises a layer corresponding to each data processing layer of the data processing system. Specifically, the stack comprises an application layer 700, a process layer 710, a library layer 720, a system call layer 730, an operating system module layer 740, an operating system layer 75, and a basic input output system layer 760 connected to target processing object via the bus subsystem 60. Examples of possible target processing objects include peripheral devices, CPUs, storage disks, and memory. In operation, attacks are passed from the attack tool 430 through the stack 440 to the target processing entity 230 via the bus subsystem 60. Responses are passed from the target processing entity 230 through the stack to the attack tool 430 via the bus subsystem 60. The control interfaces 450 at each layer of the stack 460 permit the control logic 460 to vary, under feedback control, the attack at any layer or combination of layers of the stack 460 thereby permitting the apparatus to determine the effective range of the IDS 220.

Figure 8:
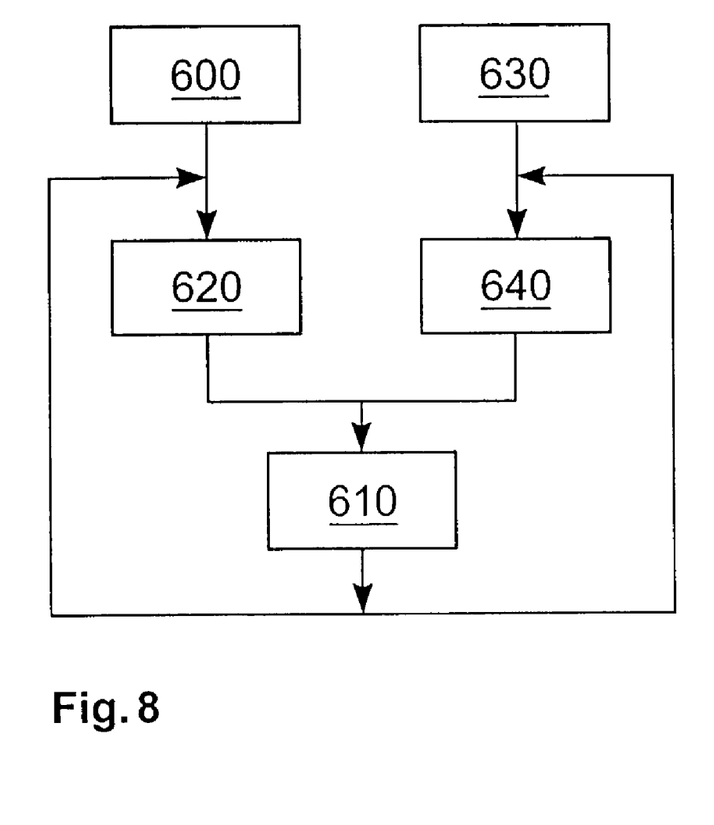

Referring now to FIG. 8, in an example of a method for testing the intrusion detection system 220 connected to the network 70 in accordance with the present invention, attack traffic 120 is generated in the network 70 by the attack generator 210 at block 600. The collector 280 receives from the intrusion detection system 220 responses 130 to the attack traffic 120 generated by the attack generator 210 at block 610. The controller 190 causes variations in the attack traffic 120 generated by the attack generator 220 in dependence on the responses 130 received by the collector 280 from the intrusion detection system 220 at block 620. Background traffic 100 on the network 70 is generated by the traffic generator 200 at block 630. The background traffic 100 generated by the traffic generator 200 is varied in dependence on the response received from the intrusion detection system 220 at block 640. It will be appreciated that the method hereinbefore described with reference to FIG. 8 is applicable to the apparatus hereinbefore described with reference to FIGS. 6 and 7.

The invention claimed is:

1. Apparatus for testing an intrusion detection system in a data processing system, the apparatus comprising:
   an attack generator for generating attack traffic on a communications path in the data processing system;
   an intrusion detection system that detects the attack traffic and generates a response thereto;
   a collector for receiving the responses generated by the intrusion detection system, and,
   a controller receiving an input from the collector and having an output coupled to the attack generator for varying further attack traffic generated by the attack generator on the communications path in dependence on the response received by the collector from the intrusion detection system.

2. Apparatus as defined in claim 1, further comprising a traffic generator for generating background traffic on the communications path.

3. Apparatus as claimed in claim 2, wherein the controller is connected to the traffic generator for varying the background traffic generated by the traffic generator in dependence on the response received from the intrusion detection system.

4. Apparatus as claimed in claim 1, wherein the attack generator comprises: an attack tool for generating the attack traffic; a plurality of logical layers disposed between the attack tool and the communication path for communicating the attack traffic from the attack tool to the communications path, each logical layer having a control interface for receiving attack variation data; and control logic connected to the controller for sending attack variation data to the logical layers via the control logic to vary the attack traffic based on control data, the attack variation data being generated by the control logic in dependence on the response received from the intrusion detection system by the collector.

5. Apparatus as claimed in claim 4 wherein said control logic initiates and varies attacks in response to configuration data having rules describing combinations of variations in attack to be generated by the attack tool, definition data that comprises attack sequence and attack variations to be carried out by the attack tool during the sequence, and attack specification data that comprises definitions of where attacks are allowed on the data communication path.

6. Apparatus as claimed in claim 1, wherein the communications path comprises a bus subsystem.

7. Apparatus as claimed in claim 1, wherein the communication path comprises a network.

8. The apparatus of claim 1, wherein the controller is adapted to send reference data indicative of intended attack variations to the collector.

9. Apparatus as claimed in claim 1 wherein said attack generator further comprises control logic that operates the attack generator in response to the responses to attack traffic received from the controller to initiate and vary attacks in response to configuration data having rules describing combinations of variations in attack to be generated by the attack generator, to definition data that comprises attack sequence and attack variations to be carried out by the attack tool during the sequence, and to attack specification data that comprises definitions of where attacks are allowed on the data communication path.

10. Apparatus as claimed in claim 1 wherein the collector also receives the attack traffic generated by the attack generator and the controller varies the further attack traffic generated by the attack generator also in dependence on the attack traffic received from the attack generator.

11. A method for testing an intrusion detection system in a data processing system, the method comprising:
    generating by an attack generator attack traffic in a communications path in the data processing system;
    the intrusion detection system receiving the attack traffic and producing responses thereto,
    receiving by a collector the responses from the intrusion detection system to the attack traffic generated by the attack generator; and,
    varying by a controller having an output to the attack generator and an input from the collector further attack traffic generated by the attack generator in dependence on the response received by the collector from the intrusion detection system.

12. The method as claimed in claim 11, further comprising generating by a traffic generator background traffic on the communication path.

13. The method as claimed in claim 12, further comprising varying the background traffic generated by the traffic generator in dependence on the response received from the intrusion detection system.

14. The method of claim 11, further comprising sending reference data indicative of intended attack variations to the collector.

15. The method as claimed in claim 11 wherein the step of varying the attack traffic comprises initiating and varying attacks in response to configuration data having rules describing combinations of variations in attack to be generated by the attack generator, definition data that comprises attack sequence and attack variations to be carried out by the attack generator during the sequence, and attack specification data that comprises definitions of where attacks are allowed on the data communication path.

16. The method as claimed in claim 11 wherein the collector also receives the attack traffic generated by the attack generator and the step of varying further comprises the controller varying the further attack traffic generated by the attack generator also in dependence on the attack traffic received from the attack generator.

17. A computer program embodied on a memory comprising computer program code means which, when loaded in a processor of a data processing system having an intrusion detection system configures the processor to perform a method for testing an intrusion detection system of the data processing system, the method comprising:
    generating by an attack generator attack traffic in a communications path in the data processing system;
    the intrusion detection system receiving the attack traffic and producing responses thereto,
    receiving by a collector the responses from the intrusion detection system to the attack traffic generated by the attack generator; and,
    varying by a controller having an output to the attack generator and an input from the collector further attack traffic generated by the attack generator in dependence on the response received by the collector from the intrusion detection system.

18. The computer program of claim 17, wherein the method further comprises sending reference data indicative of intended attack variations to the collector.

19. A data processing system comprising a processor, a memory, a bus subsystem interconnecting the memory and processor, and a computer program element stored in the memory to perform a method for testing an intrusion detection system in the data processing system, the method comprising:
    generating by an attack generator attack traffic in a communications path in the data processing system;
    the intrusion detection system receiving the attack traffic and producing responses thereto,
    receiving by a collector responses from the intrusion detection system to the attack traffic generated by the attack generator; and,
    varying by a controller having an output coupled to the attack generator and an input coupled to the collector further attack traffic generated by the attack generator in dependence on the response received by the collector from the intrusion detection system.

20. The data processing system of claim 19, wherein the controller is adapted to send reference data indicative of intended attack variations to the collector.

* * * * *